Figure 1:
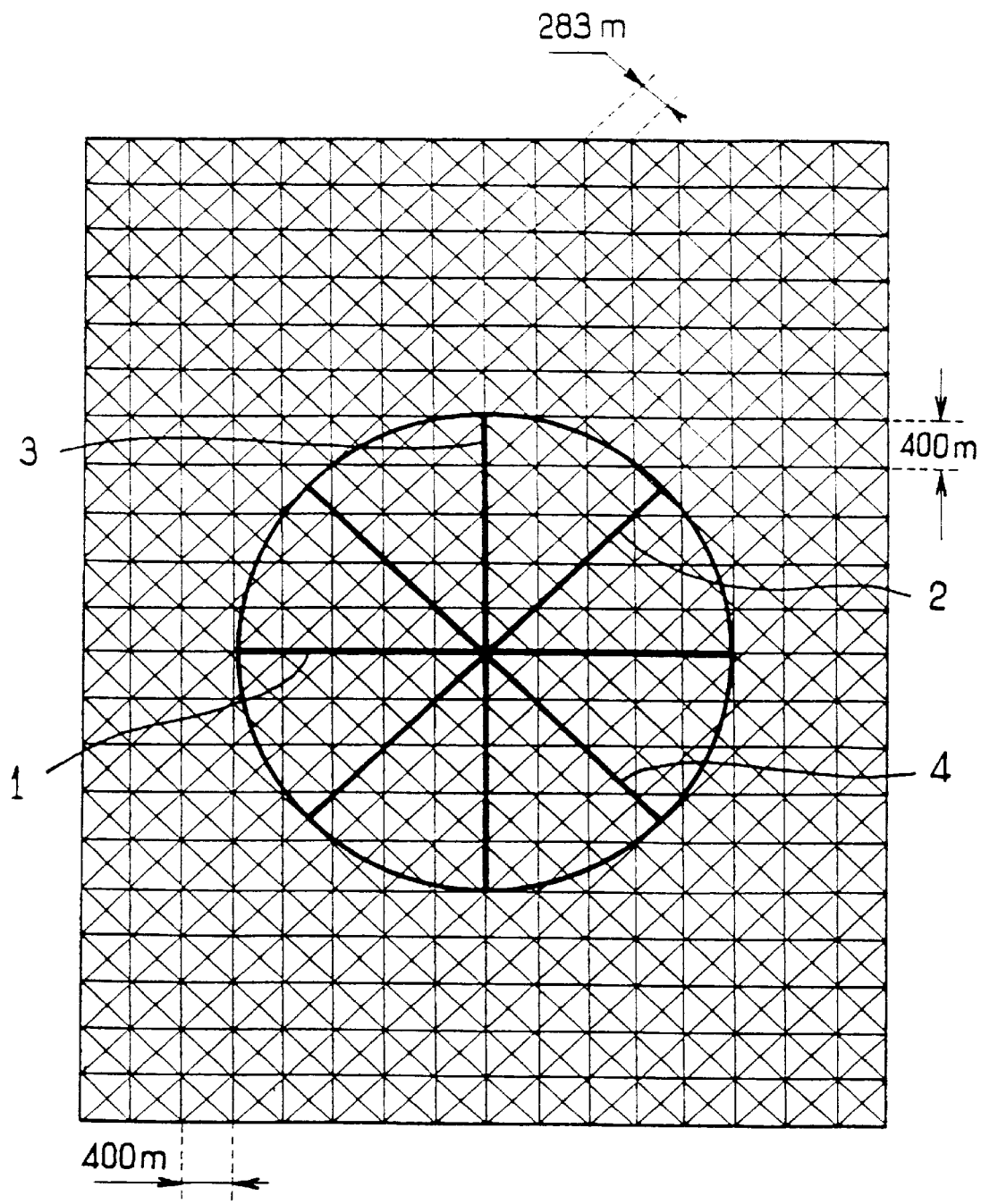

United States Patent [19]
de Bazelaire

[11] Patent Number: 6,075,752
[45] Date of Patent: Jun. 13, 2000

[54] METHOD FOR EXPLORING AN ENVIRONMENT WITH A COMPLEX TECTONICS

[75] Inventor: Eric de Bazelaire, Lescar, France

[73] Assignee: Elf Aquitaine Production, France

[21] Appl. No.: 08/716,410

[22] PCT Filed: Jan. 17, 1996

[86] PCT No.: PCT/FR96/00076

§ 371 Date: Sep. 20, 1996

§ 102(e) Date: Sep. 20, 1996

[87] PCT Pub. No.: WO96/23234

PCT Pub. Date: Aug. 1, 1996

[30] Foreign Application Priority Data

Jan. 23, 1995 [FR] France ................................ 95 00730

[51] Int. Cl.[7] ........................................... G01V 1/28
[52] U.S. Cl. ........................ 367/59; 367/56; 367/58; 367/66; 367/37; 367/73
[58] Field of Search .................... 367/50, 56, 58, 367/51, 47, 70, 53, 59, 60, 37, 73

[56] References Cited

U.S. PATENT DOCUMENTS

| | | | |
|---|---|---|---|
| 4,573,148 | 2/1986 | Herkenhoff et al. | 367/47 |
| 4,933,912 | 6/1990 | Gallagher | 367/59 |
| 4,964,096 | 10/1990 | Ruckgaber | 367/56 |
| 5,500,832 | 3/1996 | Berryhill | 367/51 |
| 5,596,547 | 1/1997 | Banscroft et al. | 367/50 |

*Primary Examiner*—Christine K Oda
*Assistant Examiner*—Anthony Jolly
*Attorney, Agent, or Firm*—Ostrolenk, Faber, Gerb & Soffen, LLP

[57] ABSTRACT

The method consists in building a common midpoint gather of seismic traces of which the CMP point is said given point, subjecting the traces of this gather to dynamic and/or static corrections, and characterized in that the gather associated with the given point (A) is built by recording four CMP sub-gathers associated with said given point along four angular directions (1 to 4) passing through said given point, and dynamic and/or static corrections are applied to each of the four CMP sub-gathers in order to determine, for each sub-gather, a value of the curvature and/or the velocity optimizing the energy of the trace stack of the corrected sub-gather concerned, the four values thus obtained representing the components of the stacking velocity field desired for each of the reflector elements corresponding to the given point, and characterized by a vertical propagation time t0 with reflection for zero offset.

Application in particular to the exploration of a medium with a complex tectonics.

16 Claims, 8 Drawing Sheets

FIG_1

FIG_2

FIG_3

FIG_4

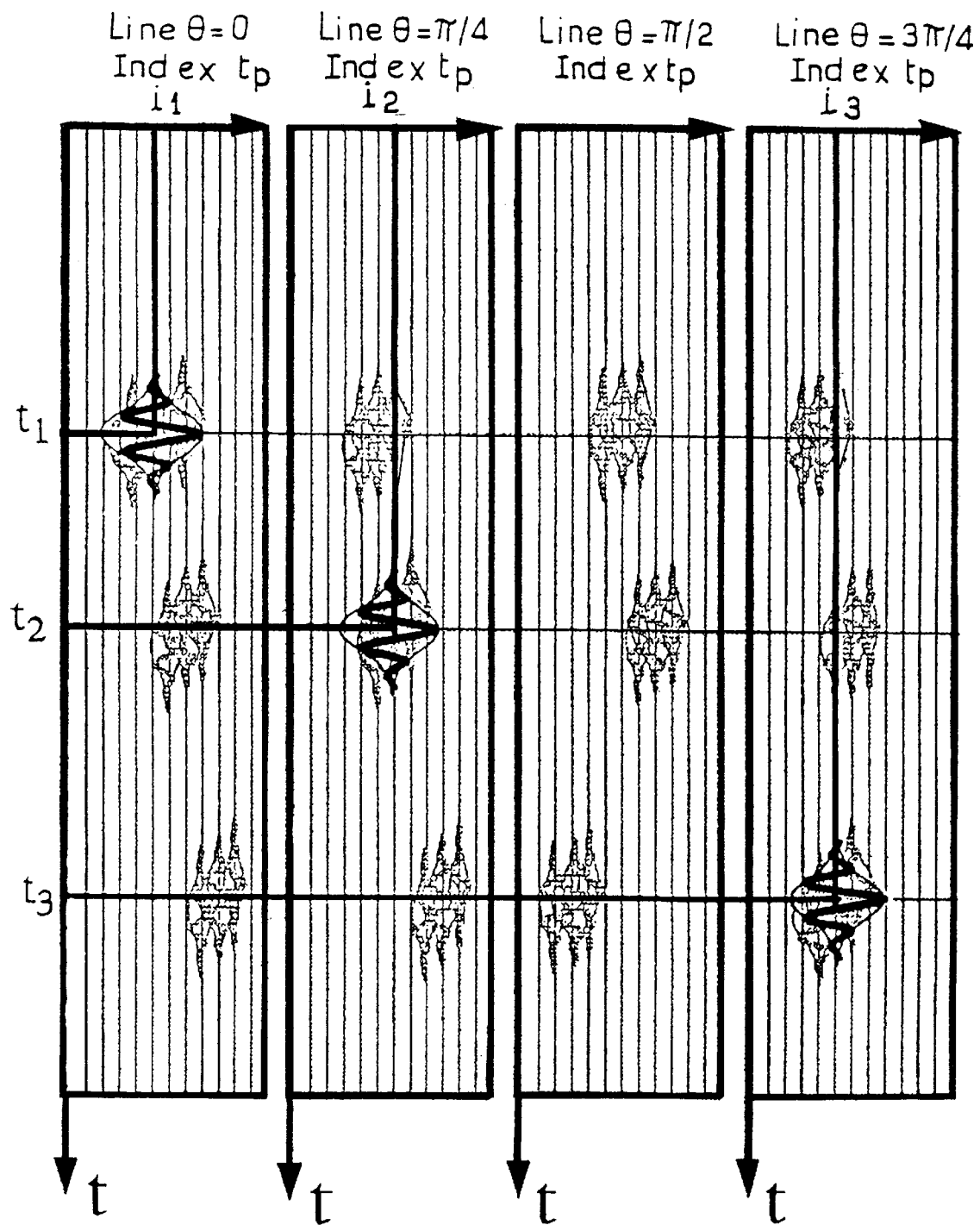
FIG_6

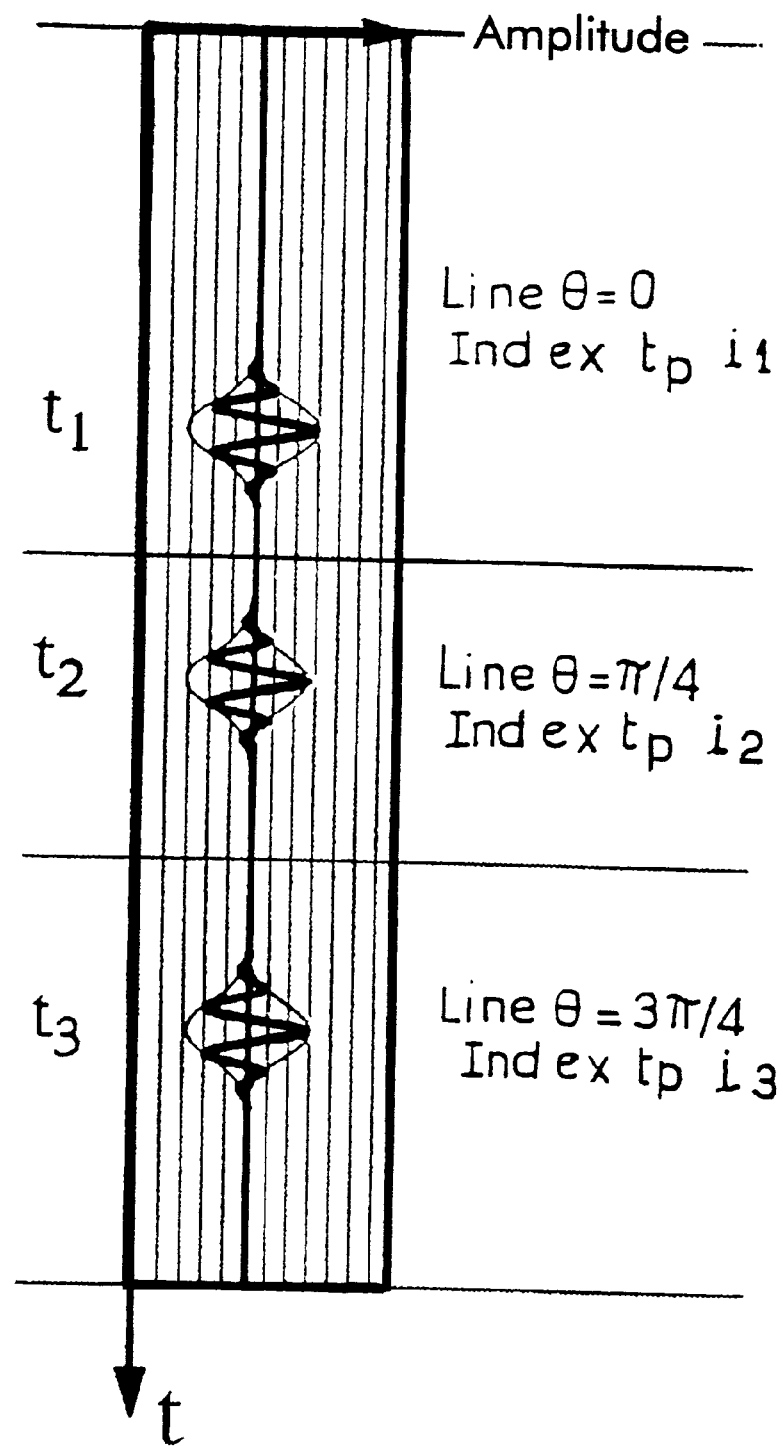
FIG_7

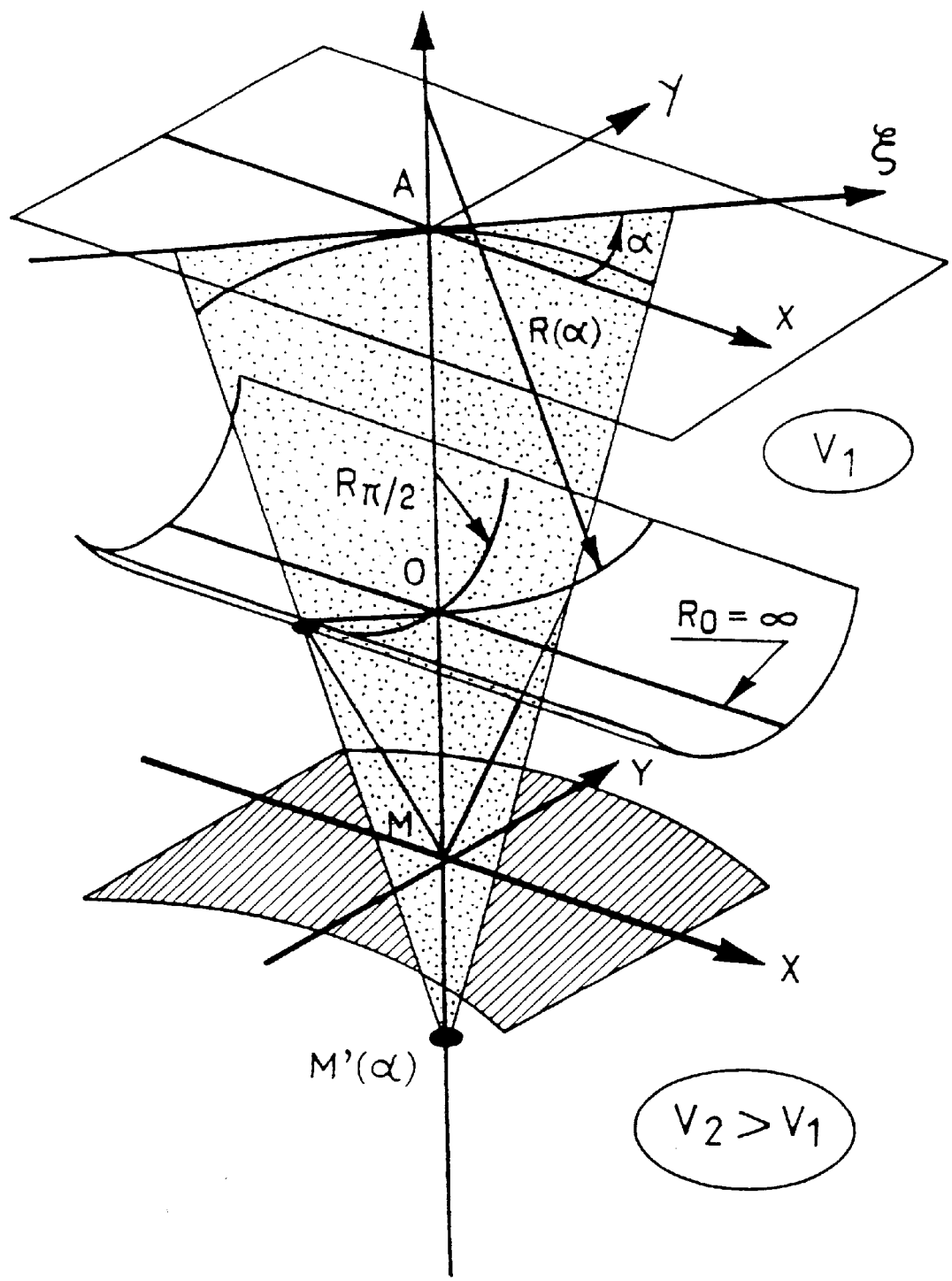
FIG_8

METHOD FOR EXPLORING AN ENVIRONMENT WITH A COMPLEX TECTONICS

In geophysical prospecting, specialists attempt to define the geometry, particularly of stratigraphic traps and/or structural traps. In the former case, the problem is one of improving the accuracy of the measurements of the time and curvature of the seismic reflectors. In the latter case, the problem is mainly one of defining a geological interval velocity field and a time stack to obtain a depth image of the subsurface to be explored.

To solve these problems of time and velocity measurement, a plurality of acquisition can be employed in a seismic reflection survey. A seismic reflection survey is a common method for obtaining a seismic image of the subsurface. In this method, using appropriate energy sources, called sources, acoustic waves are transmitted, travel in the subsurface to be explored, and are reflected on the different reflectors which it contains. The reflected waves are recorded, as a function of time, on adapted receivers disposed on the ground surface or in the water. Each recording or trace provided by a receiver is then assigned to the location of the point which is situated at the middle of the segment connecting the source to the receiver. This operation is referred to as sorting into a common midpoint (CMP) gather.

A seismic prospecting technique, which is now conventional, is multiple coverage. In this technique, the sources and receivers are disposed on the ground surface in such a way that a given midpoint gathers several recordings. The series of recordings associated with the same midpoint forms what is generally called a common midpoint gather of recordings or traces. The set of. gathers is associated with a series of different midpoints preferably located along the same processing line. To obtain these gathers, it is essential to spread the sources and receivers on the surface of the medium, in a predetermined arrangement.

Two types of spread predominate today. In the first '2D acquisition' type, the sources and receivers are aligned on one and same line. Thus all the recordings are associated with wave paths situated in the same plane, at least in the theoretical case of a subsurface structured in plane and parallel layers. This type of acquisition is routinely used, particularly for large-scale acquisitions, and to survey subsurfaces featuring a calm tectonics. In the second '3D acquisition' type, the sources and receivers are more or less uniformly distributed on a surface, in such a way that the recordings associated with the same CMP, called 'bin' in this case because the same CMP is in fact attributed to midpoint positions belonging to elementary surfaces or bins, correspond to paths which are not all situated in the same vertical plane. The latter type of acquisition is more particularly used today when higher resolution is desired (for example, reservoir engineering) or in the case of complex tectonics.

These two types of acquisition and the associated conventional seismic processing make it possible, from the CMP gathers, to obtain a depth seismic image in the vertical plane passing through all these common midpoints:

making the conventional assumption of a homogeneous and isotropic subsurface, in plane and parallel layers, dipping or not, the reflections associated with each of the subsurface reflectors, observed on a common midpoint gather, are theoretically aligned along time/distance curves which are theoretically hyperbolas centered on the vertical to the midpoint, said time/distance curves generally being defined by two parameters: the stacking velocity Vs and the zero-offset ray propagation time to; in the case of dipping plane and parallel layers, a normal moveout (NMO) correction is applicable to the measurement of the stacking velocity, either after stacking by a migration and a dip measurement, or before stacking by DMO, making the Dix equation applicable, when the recordings are parallel to the directions of the generating lines of a monoaxial cylindrical series.

It may be recalled that the Dix equation, which applies to reflections in a subsurface formed of horizontal plane and parallel layers, and for low offsets between associated sources and receivers, expresses the interval velocity Vn in a subsurface layer n bounded by reflectors n and n−1, by the equation:

$$V_n = \left[ \frac{V_{RMS(n)}^2 \times t_n - V_{RMS(n-1)}^2 \times t_{n-1}}{t_n - t_{n-1}} \right]^{1/2}$$

where $V_{RMS(n)}$ and $V_{RMS(n-1)}$ are the r.m.s. velocities for zero-offset paths from the surface to reflectors n and n−1 respectively, tn and tn−1 being the transit times of said paths. The velocities $V_{RMS}$ are close to the velocities Vs measured on the time/distance curves.

As soon as one deviates too much from these cases, the conventional treatments, all based on the assumption of plane and parallel layers (conditions of application of the Dix equation), no longer help to obtain a correct image of the subsurface. If the Dix equation is no longer applicable, the passage from time information to depth information via conventional processing leads to as many depth images as the number of treatments applied. Furthermore, the images obtained contain irreversible flaws, such as local superimpositions or the local lack of images. The presence of holes or redundant information cannot be addressed by any of the conventional processing methods which account for the dip effects or help to pass from times to depths, for example inversion, migration, tomography.

FR-A-2 296 857 attempts to make the Dix equation applicable when the subsurface is composed of plane, parallel and dipping layers. To do this, the Levin equation is used and the recommended method is only concerned with dipping plane layers, and is no longer applicable if the subsurface is composed of curved dioptric layers.

FR-A-2 648 562 recommends the use of a large quantity of traces with the same offset and variable azimuths, in order to trace a sinusoid of the variation of time and amplitude as a function of azimuth, so as to extract the main directions of,the subsurface azimuthal anisotropy. Such a method is no longer appropriate to a complex tectonics, because it is only concerned with calm or very calm tectonics.

FR-A-2 703 469 also relates to a method for analyzing the azimuthal anisotropy, exclusively applicable to calm or very calm tectonics, but not to complex tectonics. Furthermore, the method is only concerned with a single field location, as if for an imaginary well.

At all events, none of the methods described in the aforementioned patents can be used to determine the true interval velocity fields in the case of complex tectonics.

An aim of the present invention is a method for acquiring and processing seismic data, which is ideal for the study of complex tectonics, helping to remedy the aforementioned drawbacks, when one is outside the field of application of the Dix equation and when the dip effects can no longer be counterbalanced by corrective treatment such as DMO.

By way of example, subsurface deformations described either by a continuous structure whose axes rotate along its contour, or by a stack of continuous structures whose axes are rotated with respect to each other, or by deformations described by discontinuous structures due to the presence of faults perpendicular to the axis of the processing line or parallel to it, will be classified under complex tectonics. Similarly, any tectonics containing velocity edges must be considered as a complex tectonics, since, in this case, the time/distance curves display curvature variations (edge effect). Similarly, a calm area underlying an area of complex tectonics will be considered as complex.

A further aim of the present invention is to help to obtain parameters characterizing at least the stacking velocity field associated with reflector elements corresponding to a given point of the surface of said medium.

The present invention relates to a method in which four 2D seismic sections are recorded, particularly of the series type (3D style), these four 2D seismic sections being oriented in four directions rotated with respect to each other by an angle which is preferably 45 degrees.

More precisely, the method consists in making a common midpoint gather of seismic traces, of which the common midpoint is said given point, in subjecting the traces of this gather to dynamic and/or static corrections, and it is characterized by the fact that said common midpoint gather associated with said point is compiled by recording four CMP sub-gathers associated with said given point along four angular directions passing through said point, and in applying dynamic and/or static corrections to each of the four CMP sub-gathers, in order to determine for each sub-gather a value of the curvature and/or of the velocity optimizing the stacking energy of the traces of the corrected sub-gather concerned, the four values thus obtained representing the components of the desired velocity field for each of the reflector elements corresponding to the given point, each reflector element being characterized by a vertical propagation time $t_0$ with reflection for zero offset, the time $t_0$ being common to the four sub-gathers.

One advantage of the present invention resides in the fact that a 3D seismic survey can be made with 2D seismic methods for environments which can only be explored in three dimensions.

A further advantage resides in the fact that information can be obtained about areas or holes located between the areas for which information was available. This implies that, in complex tectonics, the same continuity of information is obtained as was previously obtained by the conventional 3D method in calm or non-complex tectonics.

According to a further feature of the invention, the angular directions passing through the given point are such that two consecutive directions form an acute angle ranging between 40 and 50 degrees, and preferably of about 45 degrees.

The method can be applied to a plurality of given points constituting common midpoints, located at the nodes of a regular-mesh grid, preferably in the form of a parallelogram.

The sub-gathers are advantageously acquired along lines coinciding with the sides or the diagonals of the parallelogram-shaped meshes forming the grid.

For the formation of a 3D block of stacked traces, a stacked trace is made at each midpoint forming a node of the grid, by juxtaposing the stacked traces centered on the $t_0$ values associated with the reflectors on the vertical of said midpoint, each trace portion centered on a $t_0$ value associated with a reflector being obtained by separately stacking each of the four sub-gathers of 2D traces associated with the midpoint, and by selecting the portion centered on $t_0$ of the stacked trace corresponding to the peak energy.

Figure 2:
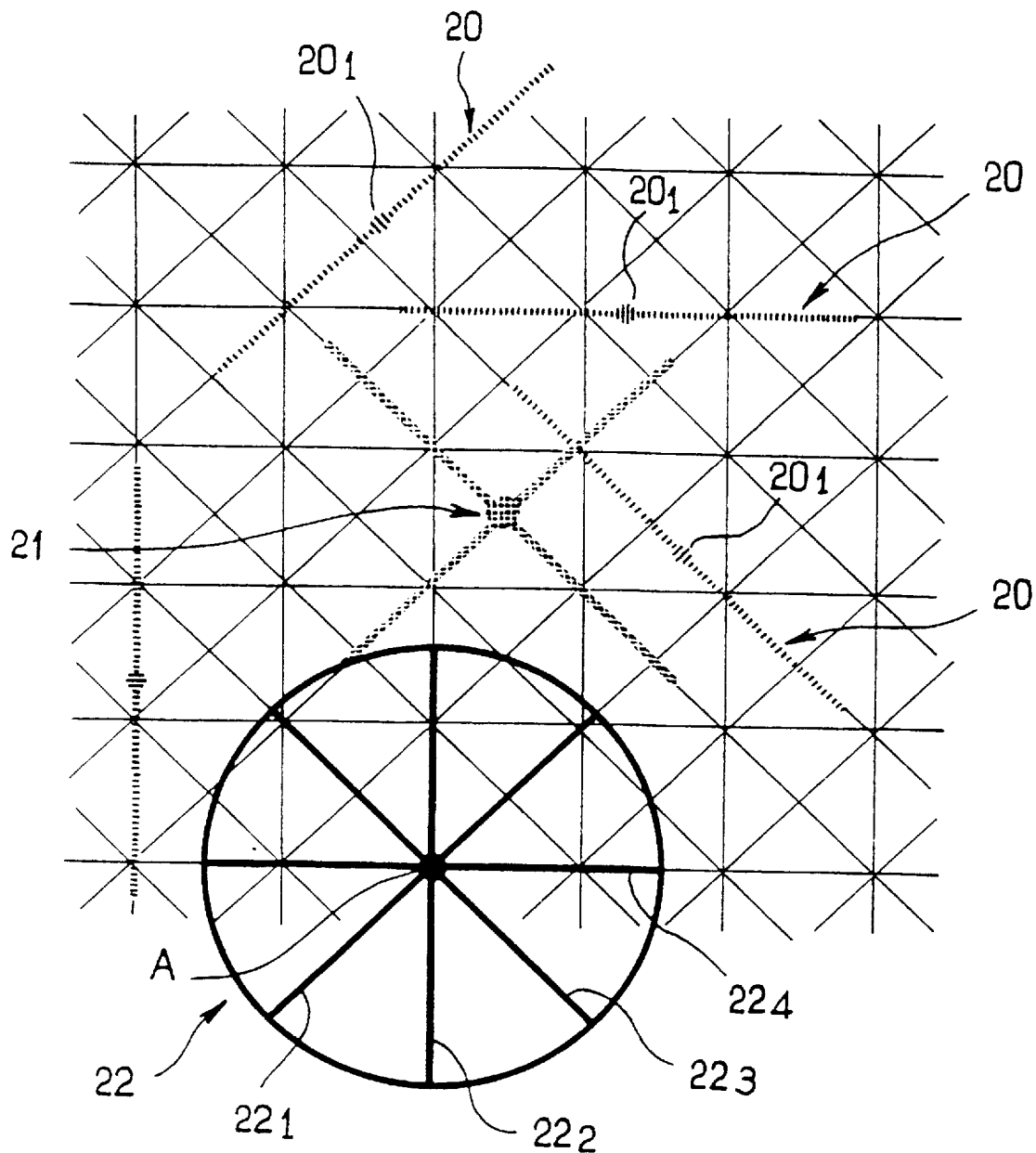
Figure 3:
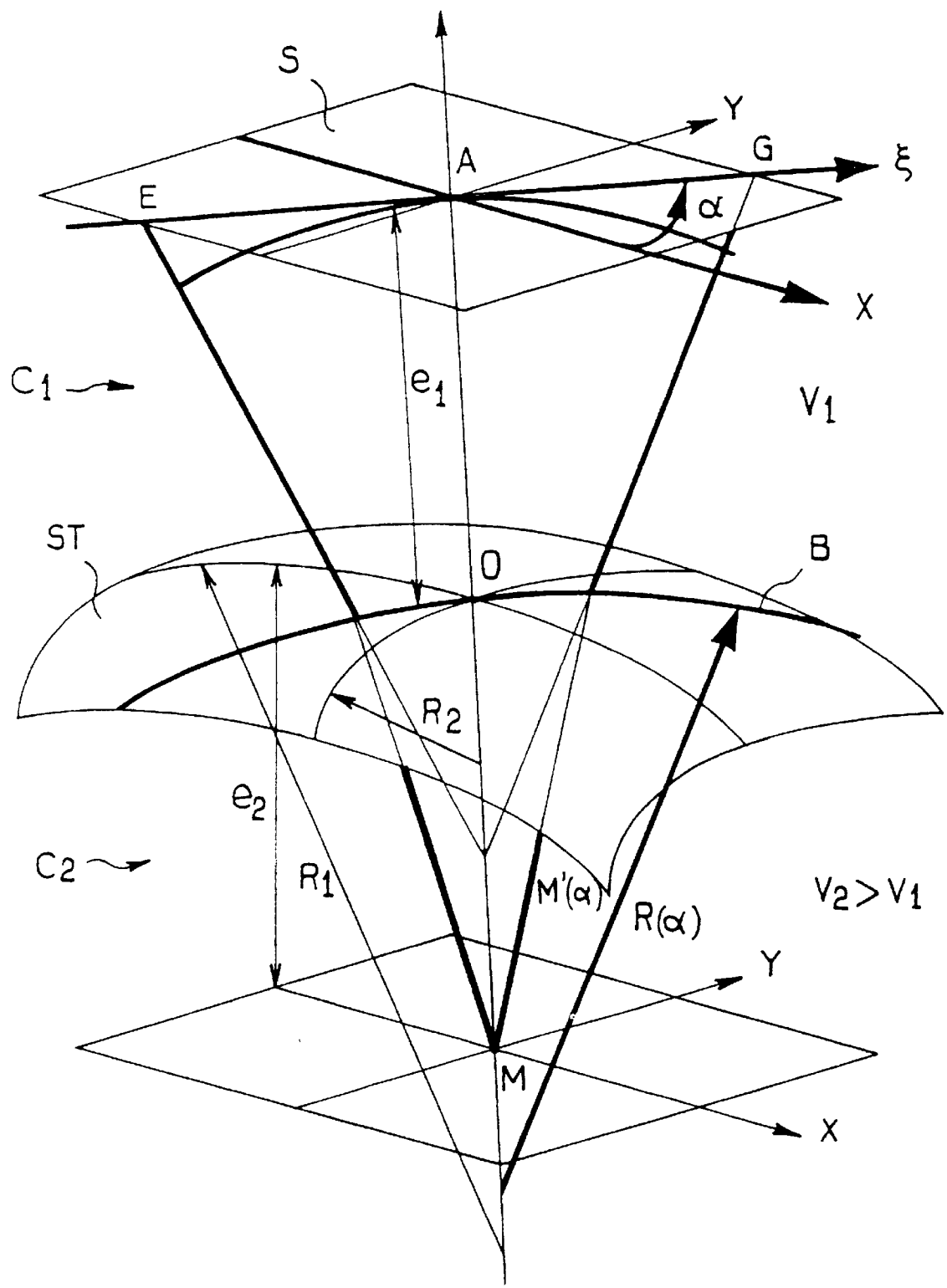
Figure 4:
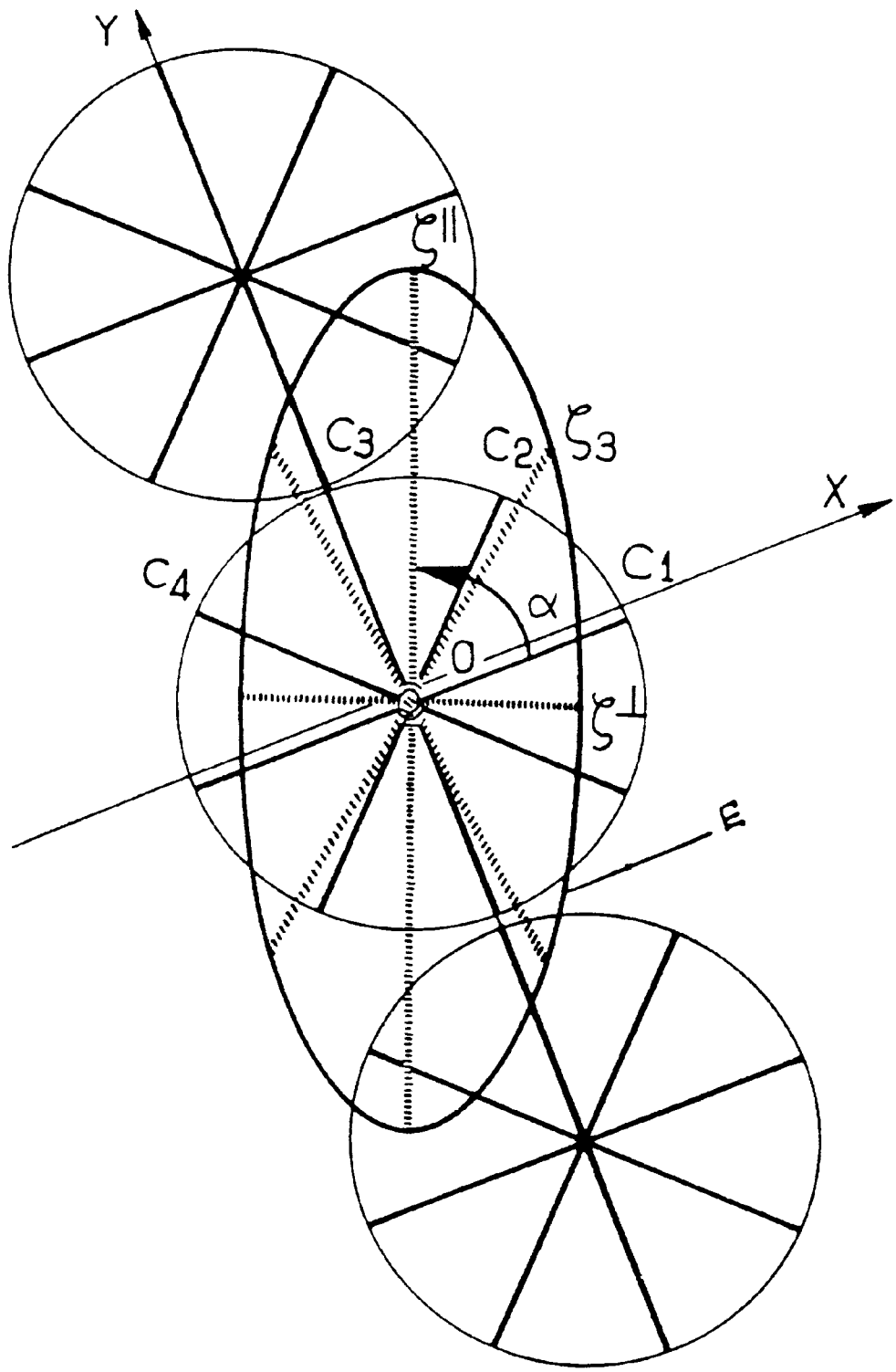
Figure 5:
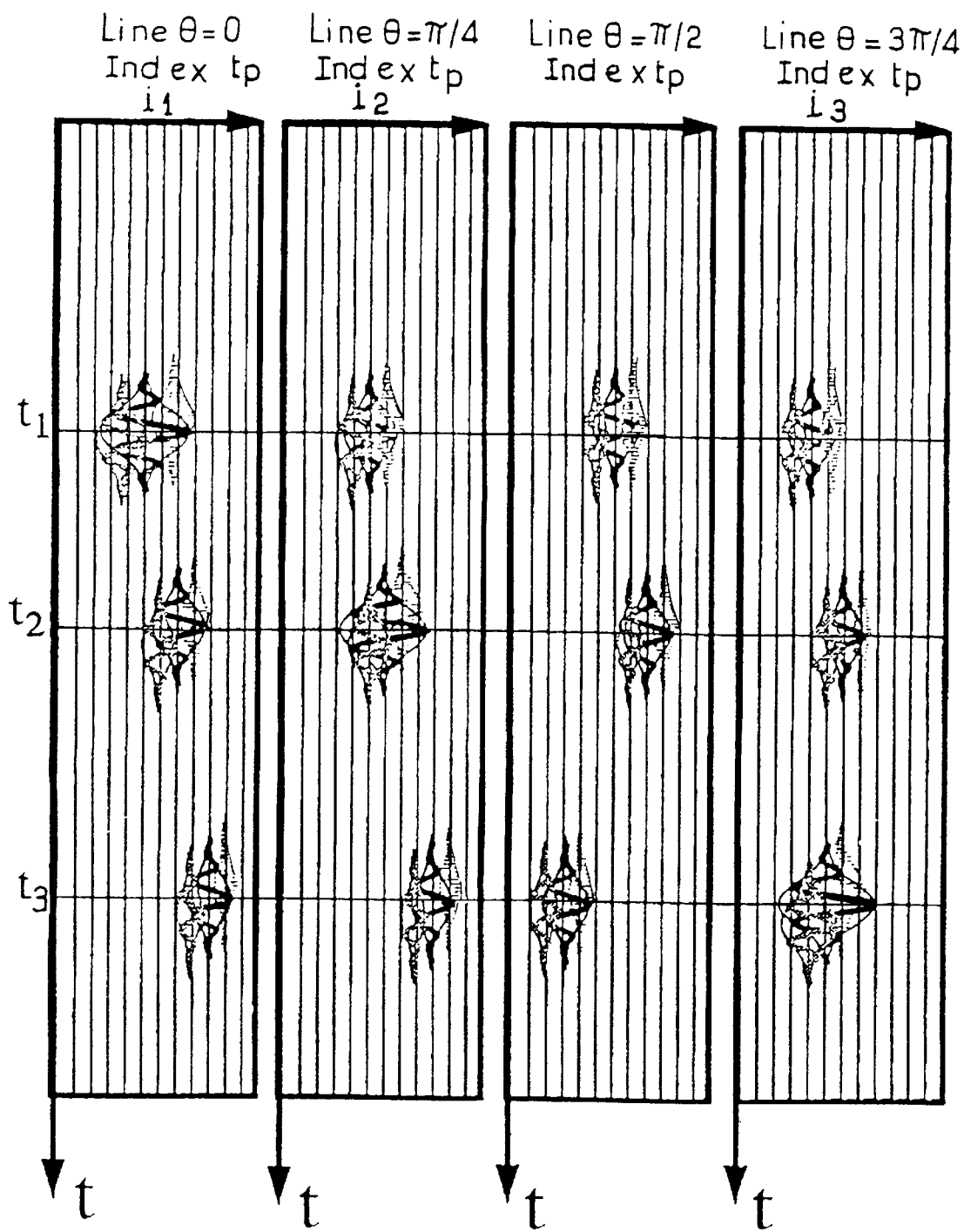

The above and other features and advantages of the invention will appear on a reading of the description of the method of the invention and the appended drawings wherein:

FIG. 1 comprises a schematic representation of a location map of the seismic data acquisition lines of the invention, the circle representing the maximum offsets of the common midpoint array which is represented by the center of the star, FIG. 2 comprises a schematic representation of three types of common midpoint gather, FIG. 3 comprises a synoptic representation of a medium with a complex tectonics, FIG. 4 represents a plan view of the lines on which the components of the velocity field and the parameters defining the surface waveform are defined, FIG. 5 comprises a schematic representation of a quadri-BAP representative of three synthetic events, FIG. 6 comprises a schematic representation of a quadri-BAP in which the events of the quadri-BAP of FIG. 5 are picked, FIG. 7 comprises a representation of the stacked trace of the energy peaks of the picked events of FIG. 6, FIG. 8 comprises a schematic representation of a medium with a monoaxial complex tectonics.

On the surface of a medium to be explored, an array is disposed for the transmission, reception and recording of seismic data from the subsurface of the medium, said array being of the type used in seismic reflection surveys. The acquisition (recording) lines, that is the lines of series of sources and recording receivers, are represented in FIG. 1 and are aimed in at least four directions 1 to 4 which are such that the angle between two consecutive directions (1,2; 2,3; 3,4) is preferably 45 degrees. With the arrangement in FIG. 1, four times 2D recordings and particularly 4×2D series recordings are obtained, that is a set of parallel acquisition lines, each series of parallel lines representing 2D recordings of the marine type or of the linear type with straddle shot, but with a space interval which is, for example, 400 m for the lines aimed along directions 1 and 3, and about 283 m for the other two series of lines at 45 degrees and aimed along directions 2 and 4. Obviously, the space interval can be decreased up to the trace interval, which is generally 25 m. Each line is recorded with conventional 2D parameters, for example 96 traces at 25 m intervals and a shot interval of 12.5 m (stack array). The recordings of the four series of lines are gathered at a common midpoint (CMP), and the CMP gathers can be classed in three categories (FIG. 2). The conventional first category, represented by a single line 20, corresponds to the source/receiver offsets, the central point 201 representing the common midpoint. This type of CMP is used for 4×2D imaging.

The second category is represented by a cross 21.

The third category is represented by a star 22 grouping four lines 221 to 224 at 45 degrees to each other. The common midpoint is centered on a given point A of the surface. This third category can be used to build four CMP sub-gathers centered on the given point A. Each CMP sub-gather is dynamically and/or statically corrected in a manner known in itself. On the third category of CMP, a curvature analysis is performed by BAP as described for the POLYSTACK method of E. de Bazelaire (Geophysics, 53 (2) 143–157 (1988)), the curvature analyses or BAP of the for lines of the same CMP are assembled in a single table with four planes or quadri-BAP, a BAP being a gather of traces, each of which is obtained from the same common midpoint gather after the application of a hyperbolic correction of the static type and a stacking, the n traces of a BAP accordingly corresponding to an investigation along n different curvatures. After this, the energy peaks are detected as for the POLYSTACK by considering the table as a whole. Once the $t_0$ have been picked, that is once the zero-offset traveltime $t_0$, corresponding to zero source/receiver distance, have been determined, the peaks are picked in each individual table for the four values $t^1{}_p(t_0)$, $t^2{}_p(t_0)$, $t^3{}_p(t_0)$ and $t^4{}_p(t_0)$, and this is done for each $t_0$ determined. These difference $t_p$ correspond to the optimal stack of each of the four sub-gathers in the neighborhood of the value $t_0$ considered in an elementary window of width 1/B, where B is the passband of the recorded signals.

FIG. 3 is a schematic representation of a subsurface of a zero-dip medium of which the surface is materialized by plane S and which comprises two layers $C_1$ and $C_2$, of different velocities $V_1$ and $V_2$, separated by a reflector presenting the shape of a torus ST, the thicknesses at the apex of the layers $C_1$ and $C_2$ being equal to $e_1$ and $e_2$ respectively.

On the surface S, the given point A is represented, the common midpoint of each sub-gather, a reference direction X in the plane of symmetry, and a recording direction $\zeta$ oriented by an angle $\alpha$ to the reference axis X.

The torus ST has the principal orthogonal radii $R_1$ and $R_2$, where $R_1$ is measured in the plane of symmetry.

The equation of the radius of curvature $R(\alpha)$ of the torus ST about point O is given by the equation:

$$\frac{1}{R(\alpha)} = \frac{\cos^2\alpha}{R_1} + \frac{\sin^2\alpha}{R_2}$$

In the case of the paraxial approximation, that is the case in which all the rays used make small angles with the axis of symmetry of the family of rays, for which the angle in radians is equal to its sine or its tangent (angles smaller than about 15 degrees), it can assume that all the rays belonging to the common midpoint (CMP) are contained in the same plane, the one defined by the recording line $\zeta$ and the line AOM where A is the given point or CMP, O is the apex of the interface or torus ST, and M is the center of curvature of the incident wavefront.

The center of curvature $M'(\alpha)$ of the output wavefront in the first layer $C_1$ is the optical image of the source point M across the interface ST with apex O. Point M' is hence determined from the position of point M and from the subsoil parameters by the optical conjugation equation (Shah and Levin 1973, and E. de Bazelaire). This equation, given below in simplified form, expresses the second-order stationarity of the traveltimes between any two points in space located on either side of the interface, and it conforms to the Fermat principle:

$$\frac{1}{V_2} \times \left(\frac{1}{OM(\alpha)} - \frac{1}{R(\alpha)}\right) = \frac{1}{V_1} \times \left(\frac{1}{OM'(\alpha)} - \frac{1}{R(\alpha)}\right) \quad (1)$$

The zero offset time $t_0$, that is for a source/receiver pair merged at the given point A, is given by the equation:

$$t_o = \frac{2e_1}{V_1} + \frac{2e_2}{V_2} \quad (2)$$

In this case, the plane approximation can be used for the sheets of rays rotated by $\alpha$.

The PSCAN theory, developed by E. de Bazelaire, defines the focusing depth $P(\alpha)$ such that $2P(\alpha) = V_1 t_p(\alpha)$, where $t_p$ is the focusing depth time. In FIG. 3, $P(\alpha)$ represents the distance $AM'(\alpha)$.

The calculation of $t_p(\alpha)$ gives:

$$t_p(\alpha) = 2e_1/V_1 + \frac{2e_2 V_2}{V_1} \frac{1}{V_1 + (V_2 - V_1)e_2[\sin^2\alpha/R_2 + \cos^2\alpha/R_1]} \quad (3)$$

Considering the following definitions:

$$t_0^1 = 2e_1/V_1 \quad \zeta_m = \frac{1}{t_p(0) - t_0^1} \quad (4)$$

$$\zeta_M = \frac{1}{t_p(\pi/2) - t_0^1} \quad \zeta(\alpha) = \frac{1}{t_p(\alpha) - t_0^1}$$

and transferring these terms to equation (3) giving $t_p(\alpha)$, we obtain:

$$\zeta(\alpha) = \zeta_m \cos^2\alpha + \zeta_M \sin^2\alpha \quad (5)$$

Equation (5) is that of an elliptical tensor which is expressed in translated curvatures.

The new equation of $t_p$ is given by the formula:

$$t_p(\alpha) = \frac{t_p(0) \cdot t_p(\pi/2) - t_0^1(t_p(0)\cos^2\alpha + t_p(\pi/2)\sin^2\alpha)}{t_p(0)\sin^2\alpha + t_p(\pi/2)\cos^2\alpha - t_0^1} \quad (6)$$

This equation has an intrinsic form: it no longer depends on the model used. It is representative of all the wavefronts which may be encountered in 3D seismic prospecting when the interfaces between the media crossed are continuous surfaces or with continuous derivatives.

It can be seen from equation (6) that, for each time value picked, there are four independent parameters to be found, which are $t_p(0)$, $t_p(\pi/2)$, $t^1{}_o$ and the angle $\alpha$ or azimuth. To obtain them, it is accordingly indispensable to take at least four independent measurements, $t^1{}_p$, $t^2{}_p$, $t^3{}_p$ and $t^4{}_p$, for the same time position $t_0$.

Since the reference axes are defined by the measurement array, the angular reference axis is hence OX. With respect to this axis, the angle $\alpha$ is defined with the axis of the largest stacking 'umbrella' $t_p$, that is the smallest curvature of the time representation of the 3D wavefront. A stacking 'umbrella' is the time representation, as a function of offsets and azimuths, of the three-dimensional wavefront received at the surface by the receivers. This is a three-dimensional extension of the hyperbolic time/distance curve which is representative in time of a circular wavefront which would be received in a two-dimensional space. The aforementioned time representation consists of a projection on the plane of the surface by an ellipse E.

This reference value is denoted:

$$t_p{}^\backslash\backslash = 1/\zeta^{\backslash\backslash} \quad (7)$$

The axis perpendicular to this quantity is the one on which the value of $t_p$ is a minimum, that is the highest curvature. This value is denoted;

$$t_p{}^\perp = 1/\zeta^\perp \quad (8)$$

The value $\zeta_3$ of the axis at 45 degrees is determined from the two previous values and the transit time $\tau$. The parameters which define the wavefront are hence:

$$\begin{pmatrix} t_p^{\backslash\backslash} \\ t_p^{\perp} \\ \tau \\ \alpha \end{pmatrix} \text{correspondant aux} \begin{pmatrix} t_p(0) \\ t_p(\pi/2) \\ t_0^1 \\ \alpha \end{pmatrix} \quad (9)$$

The right-hand parameters were defined during the analysis of the equation giving $t_p(\alpha)$.

The left-hand parameters are associated with the measurements taken by the following system of equations:

$$\begin{cases} t_p^1 = \dfrac{2t_p^{\backslash\backslash} \cdot t_p^{\perp} - \tau(t_p^{\backslash\backslash} + t_p^{\perp}) + \tau(t_p^{\perp} - t_p^{\backslash\backslash})\cos 2\alpha}{t_p^{\backslash\backslash} + t_p^{\perp} - 2\tau + (t_p^{\perp} - t_p^{\backslash\backslash})\cos 2\alpha} \\ t_p^2 = \dfrac{2t_p^{\backslash\backslash} \cdot t_p^{\perp} - \tau(t_p^{\backslash\backslash} + t_p^{\perp}) - \tau(t_p^{\perp} - t_p^{\backslash\backslash})\sin 2\alpha}{t_p^{\backslash\backslash} + t_p^{\perp} - 2\tau - (t_p^{\perp} - t_p^{\backslash\backslash})\sin 2\alpha} \\ t_p^3 = \dfrac{2t_p^{\backslash\backslash} \cdot t_p^{\perp} - \tau(t_p^{\backslash\backslash} + t_p^{\perp}) - \tau(t_p^{\perp} - t_p^{\backslash\backslash})\cos 2\alpha}{t_p^{\backslash\backslash} + t_p^{\perp} - 2\tau - (t_p^{\perp} - t_p^{\backslash\backslash})\cos 2\alpha} \\ t_p^4 = \dfrac{2t_p^{\backslash\backslash} \cdot t_p^{\perp} - \tau(t_p^{\backslash\backslash} + t_p^{\perp}) + \tau(t_p^{\perp} - t_p^{\backslash\backslash})\sin 2\alpha}{t_p^{\backslash\backslash} + t_p^{\perp} - 2\tau + (t_p^{\perp} - t_p^{\backslash\backslash})\sin 2\alpha} \end{cases} \quad (10)$$

This system must be inversed to find the parameters: $\alpha$ (azimuth), $\tau$ (transit time), $t_p^{\backslash\backslash}$ (minimum moveout), $t_p^{\perp}$ (maximum moveout) as a function of the measurements:

$$t_p^1 t_p^2 t_p^3 t_p^4 \quad (11)$$

This is an absolutely conventional calculation. The value of $\tau$ is first found by a series of linear combinations between the four equations of the aforementioned system. A second-degree equation is found: there are two values of $\tau$ which are solutions.

This means that only two wavefronts exist along the ray path extensions in the output medium, for which the stacking umbrella can be represented by an ellipsoid of curvatures. It is on these two stacking umbrellas and only on them that the two-dimensional spatial interpolation can legitimately be made. The two values of $\tau$ are:

$$\dfrac{\tau_1}{\tau_2} = \dfrac{t_p^1 t_p^4 - t_p^2 t_p^3 \pm \sqrt{(t_p^1 t_p^4 - t_p^2 t_p^3)^2 + (t_p^2 + t_p^4 - t_p^1 - t_p^3)[t_p^1 t_p^3 (t_p^2 + t_p^4) - t_p^2 t_p^4 (t_p^1 + t_p^3)]}}{t_p^2 + t_p^4 - t_p^1 - t_p^3} \quad (12)$$

For the two values of $\tau$, the value of the angle $\alpha$ is formally the same, which means that the calculated ray paths have remained coplanar.

The two values of $\alpha$ modulo $\pi$ are obtained from the following equation:

$$\tan 2\alpha = \dfrac{(t_p^2 - t_p^4)(t_p^1 - \tau)(t_p^3 - \tau)}{(t_p^3 - t_p^1)(t_p^4 - \tau)(t_p^2 - \tau)} \quad (13)$$

The values of $t_p$(parallel) and $t_p$(perpendicular) are determined from the following equations:

$$t_p^{\backslash\backslash} = \tau + 1/\zeta_{\backslash\backslash}, \ t_p^{\perp} = \tau + 1/\zeta_{\perp} \quad (14)$$

with:

$$S_{\backslash\backslash} = \dfrac{1}{2}\left(\dfrac{1}{t_p^1 - \tau} + \dfrac{1}{t_p^2 - \tau} + \dfrac{1}{t_p^3 - \tau} + \dfrac{1}{t_p^4 - \tau}\right) + \sqrt{\left(\dfrac{1}{t_p^4 - \tau} - \dfrac{1}{t_p^2 - \tau}\right)^2 + \left(\dfrac{1}{t_p^1 - \tau} - \dfrac{1}{t_p^3 - \tau}\right)^2} \quad (15)$$

$$S_{\perp} = \dfrac{1}{2}\left(\dfrac{1}{t_p^1 - \tau} + \dfrac{1}{t_p^2 - \tau} + \dfrac{1}{t_p^3 - \tau} + \dfrac{1}{t_p^4 - \tau}\right) - \sqrt{\left(\dfrac{1}{t_p^4 - \tau} - \dfrac{1}{t_p^2 - \tau}\right)^2 + \left(\dfrac{1}{t_p^1 - \tau} - \dfrac{1}{t_p^3 - \tau}\right)^2}$$

Having these four values, it is then possible to reconstruct all the intersections of the stacking umbrella (stack) by any vertical plane passing through its central axis.

In the above discussion, and particularly by reference to FIG. 1, it can be seen that the invention helps to determine the four values needed to reconstruct all the intersections of the stacking umbrella by any vertical plane passing through its central axis. Furthermore, and according to the invention, it is preferable to stack the four lines separately, and then to select the best of the four stacks. In consequence, the imaging must therefore be completely dissociated from the estimation of the velocity field, said velocities being obtained only at the points of intersection of the recording system (4×2D) for which the four lines exist at the same time. This makes it possible to estimate completely the four values needed and to determine the directions of the values of the main moveouts as a function of $t_0$. The subsoil interval velocities can then be determined by conventional two-dimensional methods, which are only valid along ray path planes of the principal directions, by using the to and the principal to separately in each plane.

FIG. 5 shows a quadri-BAP for a synthesized example of three complete events determined among the four lines at 45 degrees to each other.

Each BAP relates to a sub-gather along one of the acquisition directions $\theta=0$, $\theta=\pi/4$, $\theta=\pi/2$, and $\theta=3\pi/4$. This BAP optimizes the energy of the trace stack and is representative of events appearing at times $t_1$ to $t_3$ as a function of the subscript $t_p$ (focusing depth). At time $t_1$, it is the event of line $\theta=0$ and of subscript $i_1$ of the $t_p$ which presents the maximum energy. At time $t_2$, it is the event of the line $\theta=\pi/4$ and of subscript $i_2$ which presents the maximum energy, whereas at time $t_3$, it is the event of the line located at $3\pi/4$ and of subscript $i_3$ which presents the maximum energy. This is shown in FIG. 6, which is an example of picking of the three events.

FIG. 7 is an example of the construction of the stacked trace of the energy peaks, where the three events at the different times $t_1$, $t_2$ and $t_3$ are found. For each picked time $t_1$, $t_2$ and $t_3$, the amplitude peaks are found in each BAP of FIG. 5, making it possible to determine the $t_p$ corresponding to these peaks, that is $t^1{}_p$, $t^2{}_p$, $t^3{}_p$ and $t^4{}_p$, and for each of the picked times. These values of $t_p$ are used to calculate parameters such as $\alpha$, $\tau$, $t^{\backslash\backslash}{}_p$ and $t^{\perp}{}_p$ as indicated previously.

If the complex structure is composed of a cylindrical series (uniaxial folds), that is in which all the cylinders have generating lines that are parallel to each other and do not rotate with respect to each other, and if the direction of the axes is known, the recordings along axes at 45 degrees can be discarded in favor of the DIP and STRIKE directions, that is respectively the highest and the lowest dip. In these conditions, the DIP data and the STRIKE data are combined, whereas heretofore the DIP data or the STRIKE data were used.

Referring to FIG. 8, one can see that we are in the presence of a subsoil with a monoaxial cylindrical structure, that is the subsoil is treated as a cylinder with axis AX in which all the radii of curvature parallel to axis AX are infinite. If said direction AX is known, equation (5) of the elliptical tensor degenerates, and it suffices to measure the $t_p$ parallel and perpendicular to the axis AX to determine the entire tensor which becomes symmetrical. In fact, all the $\alpha$ terms disappear, reducing the problem to an acquisition of seismic data of the 2×2D series type in the AX (STRIKE) and AY (DIP) directions.

It is evident that other angle values can be selected between the acquisition lines, inasmuch as this results in an orthogonal base in a four-dimensional vector space.

A base is orthogonal if, when only one of the for parameters to be measured is varied, the remaining three do not vary. If the base is not orthogonal, that is if the directions of the acquisition lines are not exactly at 45 degrees to each other, another grid or star is defined whose axes are at 45 degrees, and a projection is made of the measurements of the parameters on these directions, in order to build an orthogonal base. Such a projection is only possible if the directions of the seismic data acquisition lines are sufficiently distant from each other.

In some cases, in offshore seismic surveys, for example, it may be difficult to make the four acquisition lines pass exactly through the same point. In this case, one can use the center of gravity of the area formed by the intersections of said four acquisition lines as the center of the star, and the measurements of the parameters acquired with said acquisition lines are projected on the orthogonal base corresponding to this center of gravity, to subsequently determine the wavefront parameters.

The stars 22 in FIG. 2 are used in 4×3D imaging to obtain a single 3D block from four elementary 3D blocks, and also to determine the moveouts in 4×2D and 4×3D.

I claim:

1. A method for the exploration of a medium with a complex tectonics by seismic reflection to obtain parameters characterizing at least the stacking velocity field associated with reflector elements situated at the vertical to a given point (A) of the surface of the environment (S), said method comprising building a common midpoint gather (CMP) of seismic traces of which the CMP point is said given point, subjecting the traces of this gather to dynamic or static corrections or both, building the gather associated with the given point (A) by recording four CMP sub-gathers associated with said given point along four angular directions (1 to 4) passing through said given point, and applying dynamic or status corrections or both to each of the four CMP sub-gathers in order to determine, for each sub-gather, a value of the curvature or the velocity or both optimizing the energy of the trace stack of the corrected sub-gather concerned, the four values thus obtained representing the components of the stacking velocity field desired for each of the reflector elements corresponding to the given point, and characterized by a vertical propagation time to with reflection for zero offset.

2. The method of claim 1, characterized in that, from the four components of the stacking velocity field associated with one of said reflector elements, parameters are determined such as $\alpha$, $\tau$, $t^{\backslash\backslash}_p$ and $t^{\perp}_p$ characterizing the wavefront associated with said reflector element, $\alpha$ representing the azimuth of the highest curvature with respect to a predetermined reference direction, $t^{\backslash\backslash}_p$ and $t^{\perp}_p$ respectively denoting the inverse of the lowest and highest curvatures of the time representation as a function of offsets and azimuths, and $\tau$ denoting the transit time.

3. The method of claim 1, characterized in that the angular directions passing through the given point are such that two consecutive directions make an acute angle of between 40 and 50 degrees, and preferably of about 45 degrees.

4. The method of claim 1, characterized in that it is applied to a plurality of given points constituting common midpoints, situated at the nodes of a regular-mesh grid.

5. The method of claim 4, characterized in that the sub-gathers are acquired along lines coinciding with the sides or the diagonals of the parallelogram-shaped meshes forming the grid.

6. The method of claim 5, for the construction of a 3D block of stacked traces, characterized in that, at each midpoint forming a node of the grid, a stacked trace is built by juxtaposing the trace portions centered on the $t_0$ values associated with the reflectors at the vertical to said midpoint, each trace portion centered on a value $t_0$ associated with a reflector being obtained by separately stacking each of the four sub-gathers of 2D traces associated with the midpoint and by selecting the portion centered on $t_0$ of the stacked trace corresponding to the energy peak.

7. The method of claim 1, characterized in that, if the subsurface structure to be explored is a monoaxial cylindrical structure of which the direction of the longitudinal axis (AX) is determined, seismic data of the 2×2D series type are acquired only in the directions parallel (STRIKE) and perpendicular (DIP) to said axis (AX).

8. The method of claim 4, characterized in that the regular-mesh grid is in the form of a parallelogram.

9. The method of claim 8, characterized in that the sub-gathers are acquired along lines coinciding with the sides or the diagonals of the parallelogram-shaped meshes forming the grid.

10. The method of claim 9, for the construction of a 3D block of stacked traces, characterized in that at each midpoint forming a node of a grid, a stacked trace is built juxtaposing the trace portions centered on the $t_0$ values associated with the reflectors at the vertical to said midpoint, each trace portion centered on a value $t_0$ associated with a reflector being obtained by separately stacking each of the four sub-gathers of 2D traces associated with the midpoint and by selecting the portion centered on $t_0$ of the stacked trace corresponding to the energy peak.

11. The method of claim 4, characterized in that the angular directions passing through the given point are such that two consecutive directions make an acute angle of about 45 degrees.

12. The method of claim 4, characterized in that the angular directions passing through the given point are such that two consecutive directions make an acute angle of between 40 and 50 degrees.

13. The method of claim 12, characterized in that it is applied to a plurality of given points constituting common midpoints, situated at the nodes of a regular-mesh grid.

14. The method of claim 13, characterized in that the regular-mesh grid is in the form of a parallelogram.

15. The method of claim 14, characterized in that the sub-gathers are acquired along lines coinciding with the sides or the diagonals of the parallelogram-shaped meshes forming the grid.

16. The method of claim 15, for the construction of a 3D block of stacked traces, characterized in that at each midpoint forming a node of a grid, a stacked trace is built juxtaposing the trace portions centered on the $t_0$ values associated with the reflectors at the vertical to said midpoint, each trace portion centered on a value $t_0$ associated with a reflector being obtained by separately stacking each of the four sub-gathers of 2D traces associated with the midpoint and by selecting the portion centered on $t_0$ of the stacked trace corresponding to the energy peak.

* * * * *